(12) United States Patent
Wang et al.

(10) Patent No.: US 11,388,415 B2
(45) Date of Patent: Jul. 12, 2022

(54) SUBSTITUTIONAL END-TO-END VIDEO CODING

(71) Applicant: TENCENT AMERICA LLC, Palo Alto, CA (US)

(72) Inventors: Xiao Wang, Boston, MA (US); Wei Jiang, San Jose, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/231,537

(22) Filed: Apr. 15, 2021

(65) Prior Publication Data

US 2021/0360259 A1    Nov. 18, 2021

Related U.S. Application Data (60) Provisional application No. 63/023,687, filed on May 12, 2020, provisional application No. 63/026,397, filed on May 18, 2020.

(51) Int. Cl.
| | | |
|---|---|---|
| *H04N 19/147* | (2014.01) | |
| *H04N 19/149* | (2014.01) | |
| *G06N 3/08* | (2006.01) | |
| *H04N 19/172* | (2014.01) | |
| *H04N 19/184* | (2014.01) | |

(52) U.S. Cl.
CPC ............. *H04N 19/147* (2014.11); *G06N 3/08* (2013.01); *H04N 19/149* (2014.11); *H04N 19/172* (2014.11); *H04N 19/184* (2014.11)

(58) Field of Classification Search
CPC .. H04N 19/147; H04N 19/149; H04N 19/172; H04N 19/184; G06N 3/08
See application file for complete search history.

(56) References Cited

U.S. PATENT DOCUMENTS

| | | | |
|---|---|---|---|
| 2010/0239015 A1* | 9/2010 | Wang | H04N 19/159 |
| | | | 375/240.16 |
| 2018/0107926 A1* | 4/2018 | Choi | G06N 3/0472 |
| 2021/0117776 A1* | 4/2021 | Cheng | G06N 3/0481 |
| 2021/0127140 A1* | 4/2021 | Hannuksela | H04N 19/176 |

OTHER PUBLICATIONS

Johannes Ball'e et al, End-To-End Optimized Image Compression. Published as a conference paper at ICLR 2017, Mar. 3, 2017, 27 pgs.

\* cited by examiner

*Primary Examiner* — Tracy Y. Li
(74) *Attorney, Agent, or Firm* — ArentFox Schiff LLP (57) ABSTRACT

A method of video encoding at a video encoder can include receiving a picture, and determining a substitutional representation of the picture by performing an optimization process to tune elements of the substitutional representation of the picture to optimize a rate-distortion performance of coding the substitutional representation of the picture based on an end-to-end (E2E) optimized framework. The E2E optimized framework can be an artificial neural network (ANN) based video coding framework that is pretrained. The substitutional representation of the picture can be encoded to generate a bitstream.

18 Claims, 7 Drawing Sheets

SUBSTITUTIONAL END-TO-END VIDEO CODING

INCORPORATION BY REFERENCE

This present disclosure claims the benefit of priority to U.S. Provisional Application No. 63/023,687, "Substitutional End-to-End Image Compression" filed on May 12, 2020, and No. 63/026,397, "Substitutional End-to-End Image Compression with Bitrate Constraint" filed on May 18, 2020. The disclosures of both the prior applications are incorporated by reference herein in their entirety.

TECHNICAL FIELD

The present disclosure describes embodiments generally related to video coding based on artificial neural networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A traditional hybrid video codec is difficult to be optimized as a whole. An improvement of a single module may not result in a gain in overall performance. In contrast, in an artificial neural network based video coding framework, by performing a machine learning process, different modules can be jointly optimized from input to output to improve a final objective (e.g., rate-distortion performance), resulting in an end-to-end (E2E) optimized video coding framework.

SUMMARY

Aspects of the disclosure provide a method of video encoding at a video encoder. The method can include receiving a picture, and determining a substitutional representation of the picture by performing an optimization process to tune elements of the substitutional representation of the picture to optimize a rate-distortion performance of coding the substitutional representation of the picture based on an end-to-end (E2E) optimized framework. The E2E optimized framework can be an artificial neural network (ANN) based video coding framework that is pretrained. The substitutional representation of the picture can be encoded to generate a bitstream.

In an embodiment, the optimization process is performed to tune the elements of the substitutional representation of the picture to optimize a loss function with respect to values of the elements of the substitutional representation of the picture. In an embodiment, the optimization process can be performed based on hyper-parameters including a step size and a number of iterations. The step size or the number of iterations can be prefixed or adjusted per picture input to the video encoder. In an embodiment, a current iteration of the optimization process can include performing a gradient descent to adjust current values of the elements of the substitutional representation of the picture to minimize the loss function, and using the adjusted current values of the elements of the substitutional representation of the picture as an input of a next iteration of the optimization process.

In an embodiment, the loss function includes a weighted sum of a bitrate measure and a distortion measure for coding the substitutional representation of the picture based on the E2E optimized framework. In an example, the distortion measure includes a difference between the picture and a reconstructed picture of the substitutional representation of the picture when coded based on the E2E optimized framework. In an example, a trade-off coefficient in the weighted sum can be adjusted to adjust a bitrate for coding the picture based on the E2E optimized framework.

In an embodiment, the bitrate measure includes a difference between a target bitrate and a bitrate for coding the substitutional representation of the picture based on the E2E optimized framework. The target bitrate in the weighted sum can be adjusted to adjust a bitrate for coding the picture using the E2E optimized framework.

In an embodiment, the distortion measure is based on a target distortion metric type that can be different from or the same as a distortion metric type used for optimizing the E2E optimized framework. In an embodiment, the distortion measure is based on a target distortion level of a distortion metric type that can be different from or the same as a distortion level of the same distortion metric type used for optimizing the E2E optimized framework.

Aspects of the disclosure also provide an apparatus of video encoding. The apparatus can include circuitry configured to receive a picture and determine a substitutional representation of the picture by performing an optimization process to tune elements of the substitutional representation of the picture to optimize a rate-distortion performance of coding the substitutional representation of the picture based on an end-to-end (E2E) optimized framework. The E2E optimized framework can be an ANN based video coding framework that is pretrained. The circuitry can further be configured to encode the substitutional representation of the picture to generate a bitstream.

Aspects of the disclosure provide a non-transitory computer-readable medium storing instructions that, when executed by a processor, cause the processor to perform the method of video encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
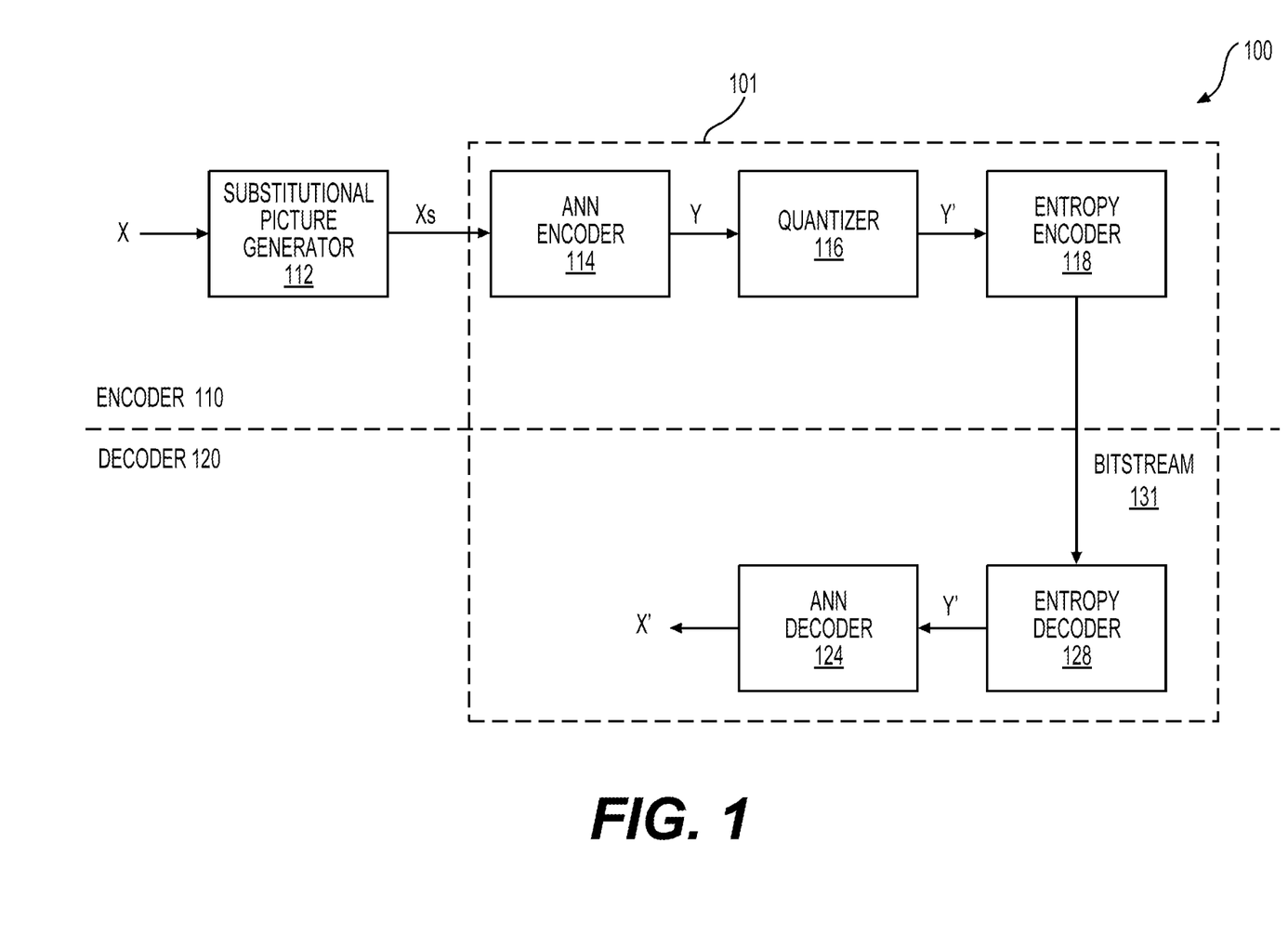
FIG. 1 shows a substitutional end-to-end (E2E) video coding system (100) according to embodiments of the disclosure.

FIG. 1 shows a substitutional end-to-end (E2E) video coding system (100) according to embodiments of the disclosure. The system (100) can include an encoder 110 and a decoder 120. The encoder 110 can include a substitutional picture generator (112), an artificial neural network (ANN)-based encoder (ANN encoder) (114), a quantizer (116), and an entropy encoder (118). The elements (112, 114, 116, and 18) are connected as shown in FIG. 1. The decoder (120) can include an entropy decoder (128) and an ANN-based decoder (ANN decoder) (124). The elements (128 and 124) are connected with each other as shown in FIG. 1. The elements (114, 116, 118, 128, and 124) form an E2E optimized video coding framework (E2E optimized framework or E2E framework) (101).

The substitutional picture generator (112) is configured to receive a picture X (or an image X), for example, from a video including a sequence of pictures and generate a substitutional picture Xs corresponding to the input picture X. The substitutional picture Xs is fed to the E2E framework (101). According to the disclosure, the substitutional picture Xs can be learned based on the E2E framework (101). The learned substitutional picture Xs can be visually similar to the original input picture X but a superior alteration than the original input picture X. For example, in some embodiments, a better rate-distortion performance can be achieved for processing the substitutional picture Xs through the E2E framework (101) than directly feeding the original picture X into the E2E framework (101).

The E2E framework (101) processes the substitutional picture Xs to generate a reconstructed picture X'. Specifically, the ANN encoder (114) transforms the substitutional picture Xs into a more compact latent representation Y. Spatial correlations among pixels of the input picture Xs can be removed and vital feature information can be reserved in the latent representation Y. In various examples, dimensionality of the input picture Xs can be reduced or maintained. The quantizer (116) can further compress the latent representation Y by applying lossy quantization operations. A quantization representation Y' output from the quantizer (116) can be entropy coded by the entropy encoder (118) to generate a bitstream (131). This entropy-encoding operation can be lossy or lossless in various embodiments. Examples of entropy coding methods can include Huffman coding, arithmetic coding, context-adaptive binary arithmetic doing, or the like. The bitstream (131) can be transmitted to the decoder (120) or stored and later processed by the decoder (120).

At the decoder (120), the entropy decoder (128) receives coded bits of the substitutional picture Xs from the bitstream (131) and decodes the coded bits to recover the quantization representation Y'. The recovered quantization representation Y' can be fed to the ANN decoder (124) where an ANN-based transform can take place to generate the reconstructed picture X'.

In various embodiments, the ANN encoder (114) or the ANN decoder (124) can employ ANNs of various types, having various architectures, and being trained with various machine learning methods. For example, the ANNs can be deep neural networks (DNNs) of various types. The E2E framework (101) can have various architectures such as one-time feed-forward frameworks (e.g., generalized divisive normalization (GDN) transform, hyperprior model, residual auto encoder, deep residual auto-encoder, or multiscale model), multistage recurrent frameworks (e.g., vanilla, stateful, incremental, skip-connection, or stateful propagation), or the like.

Figure 2:
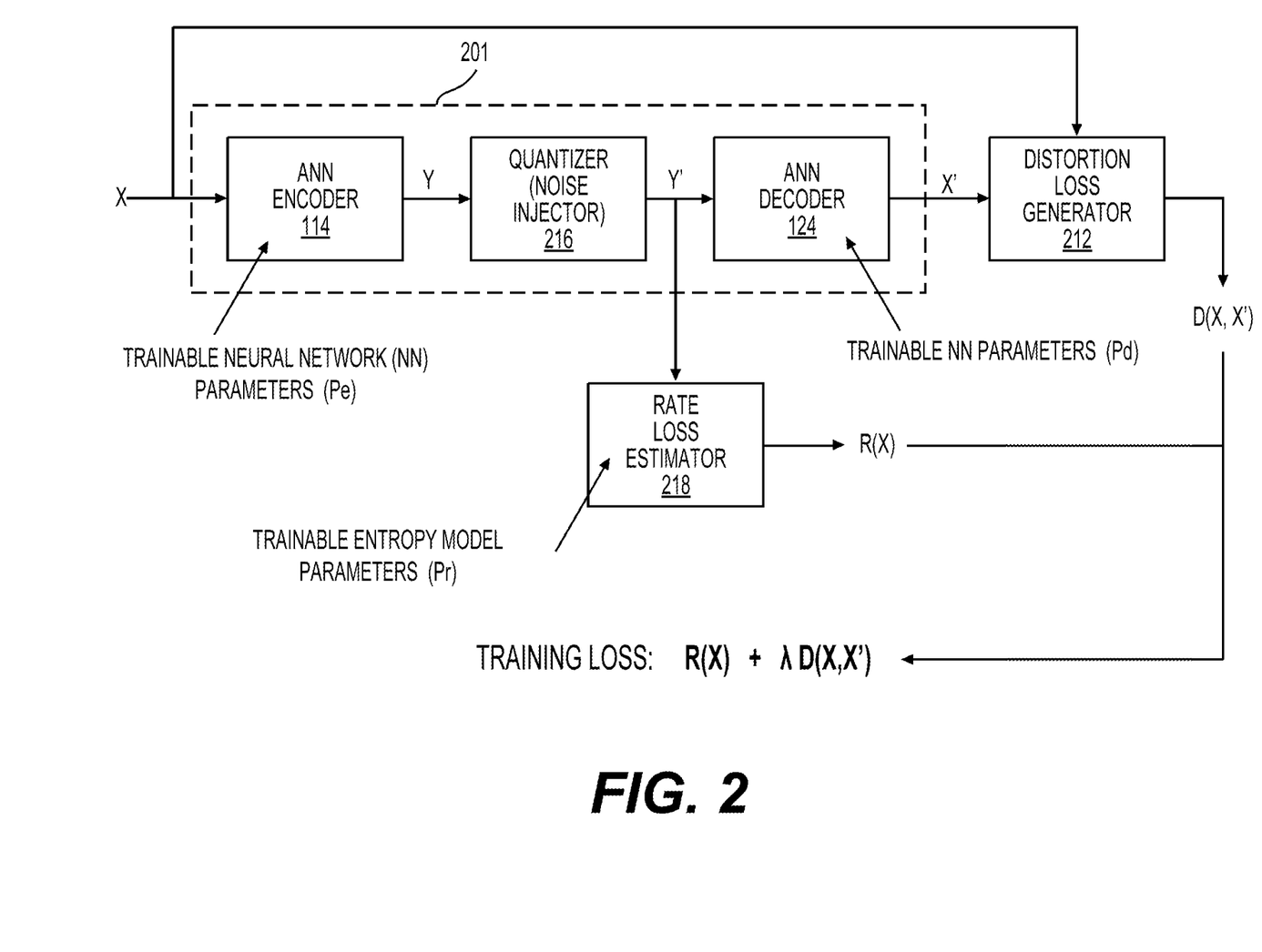
FIG. 2 shows an example of how to train the E2E framework (101).

FIG. 2 shows an example of how to train the E2E framework (101). For training the E2E framework (101), an E2E training framework (201) shown in FIG. 2 is employed. The E2E training framework (201) includes the ANN encoder (114) and the ANN decoder (124) without the entropy encoder (118) and the entropy decoder (128) in this particular example. In addition, for training purpose, the quantizer (116) is replaced with a noise injector (216) to substitute a noise addition operation for the non-differentiable quantization operation.

A loss function that indicates a rate-distortion performance of the E2E training framework (201) can be established as follows. In FIG. 2, an input picture X can be received at the ANN encoder (114). The ANN encoder (114) can include an ANN having neural network (NN) parameters (denoted Pe) that are to-be-optimized variables. Based on the NN parameters Pe, a latent representation Y can be obtained. The noise injector (216) can add uniform noise to elements of the latent representation Y to generate a quantization representation Y'. While additive uniform noise is used to replace the true quantization in FIG. 2 example for purpose of making the E2E training framework (201) end-to-end trainable, other techniques can be used in various embodiments to approximate the non-differentiable quantization by a differentiable process. For example, direct rounding can be used in forwarding and back propagation of gradient; a soft-to-hard vector quantization can be used to replace direct scalar quantization; or, quantization parameters can be learned through a training process.

The ANN decoder (124) can also include an ANN network having NN parameters (denoted Pd) that are to-be-optimized variables. The ANN decoder (124) can receive the quantization representation Y' and, based on the NN parameters Pd, transform the quantization Y' to a reconstructed picture X'. A distortion loss generator (212) can determine a distortion loss D(X, X') based on differences between the input picture X and the reconstructed picture X'. The distortion loss D(X, X') can be a function of the parameters Pe and Pd. In various embodiments, various distortion metrics (or quality metrics) can be employed for determining the distortion loss. Examples of the distortion metrics can include peak signal-to-noise ratio (PSNR), high-dynamic range visual difference predictor (HDR-VDP), structural index similarity (SSIM), multiscale structural similarity (MS-SSIM), or the like.

In addition, a rate loss estimator (218) can be employed to estimate an entropy for each elements of the quantization representation Y' according to an entropy model. The entropy model used by the rate loss estimator (218) can include entropy model parameters (denoted Pr) that are to-be-optimized variables. Based on the estimated entropies, a number of bits for coding the quantization representation Y' can accordingly be determined by the rate loss estimator (218). A bitrate (e.g., bit per pixel (BPP) or bit per second (BPS)) can thus be determined and used as an estimate of a rate loss R(X) for coding the input picture X. The rate loss R(X) can be a function of the NN parameters Pe and the entropy model parameters Pr.

Various techniques for estimating the entropies and the rate loss can be employed in various embodiments. Examples of entropy estimation can include employment of elementwise independent entropy models to estimate the probability distribution of the latent representations, explicitly estimation of entropy with hyperpriors, predictive models, or other learned parametric models, or the like. An example of the rate loss estimation method is described by J. Balle et al., "End-to-end Optimized Image Compression" in the International Conference on Learning Representations (ICLR) 2017, which is incorporated by reference by its entirety.

The loss function, with respect to the NN parameters Pe and Pd and the entropy model parameters Pr, can then be established as a weighted sum of the rate loss R(X) and the distortion loss D(X, X'), $$L(Pe, Pd, Pr) = R(X) + \lambda D(X, X'), \quad (Eq. 1)$$

where $\lambda$ is a trade-off coefficient.

During a training process, the E2E training framework (210) and the rate loss estimator (218) as a whole can be optimized from the input end of X to the output end of X'. The parameters Pe, Pd, and Pr can be updated (or optimized) guided by a target to minimize the loss function L(Pe, Pd, Pr) over the NN parameters Pe and Pd and the entropy model parameters Pr. For example, using a certain amount of picture as training samples, gradient descent can be performed based on the loss function L(Pe, Pd, Pr) to gradually adjust the NN parameters Pd and Pe and the entropy mode parameters Pr until a certain rate-distortion performance is reached. Examples of the gradient descent algorithms can include batch gradient descent, stochastic gradient descent, mini-batch gradient descent, or the like.

The optimized parameters Pe, Pd, and Pr resulting from the training process can then be used in the E2E framework (101) to implement the video coding system (100). For entropy coding, the entropy model with the optimized entropy model parameters Pr obtained from the training process can be used in the entropy encoder (118) and the entropy decoder (128) for entropy-encoding or -decoding the quantization representation Y' in the FIG. 1 example.

Figure 3:
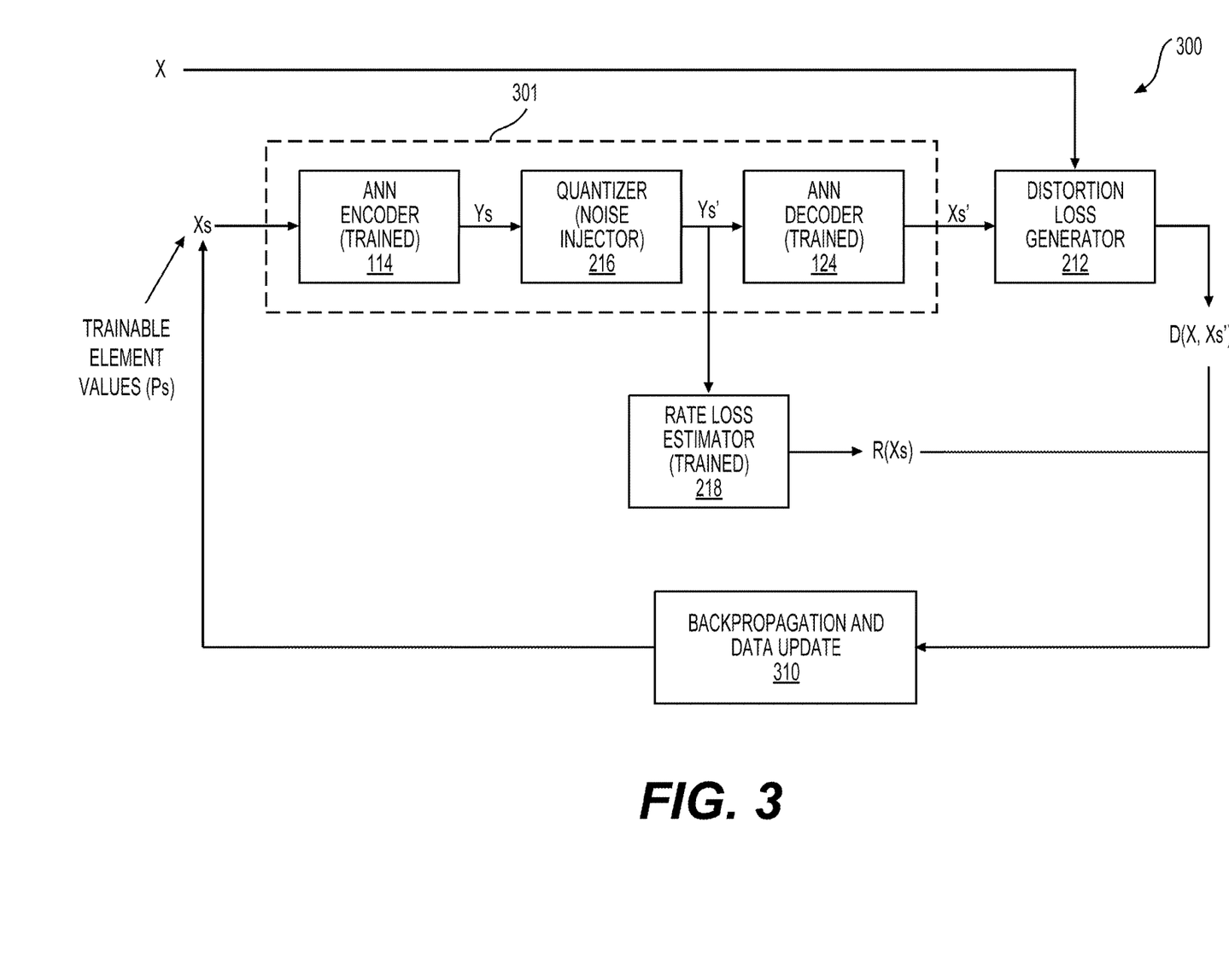
FIG. 3 shows a machine learning process (300) according to embodiments of the disclosure.

FIG. 3 shows a machine learning process (or referred to as an optimization process) (300) according to embodiments of the disclosure. The learning process (300) can be performed at the substitutional picture generator (112) in the FIG. 1 example to determine the substitutional picture Xs as an output with the original picture X as an input.

As described above, in some embodiments, the E2E optimized framework (101) can be trained using a certain amount of pictures as training samples. The resulting framework (101) can have an averagely-optimized performance for a large amount of input pictures. However, the E2E optimized framework (101), after being trained, may lack adaptability for handling pictures having variable probability characteristics. For example, for pictures with certain deviation from average characteristics of the training samples, their rate-distortion performance may be below an expected threshold. Finding a substitutional representation to replace an original input picture can be considered to be a method for improving the adaptability of the E2E video coding system (100) where an input picture is adapted to the E2E optimized framework (101) instead of the E2E optimized framework (101) being adapted to the input picture.

The substitutional picture Xs in FIG. 1 can be learned based on an E2E trained framework (301) shown in FIG. 3.

The E2E trained framework (301) can include the ANN encoder (114) and the ANN decoder (124) from the E2E optimized framework (101). The ANN encoder (114) and the ANN decoder (124) are already trained and configured with the optimized parameters Pe and Pd, respectively. The E2E trained framework (301) can also include the quantizer (e.g., a noise injector) (216) that is used for training the E2E framework (101). In addition, the learning process (300) can employ the rate loss estimator (218) and the distortion loss generator (212) that are used for training the E2E framework (101). The rate loss estimator (218) is already trained and configured with the optimized parameters Pr.

The learning process (300) can include multiple iterations. During the learning process (300), the substitutional picture Xs is tuned gradually. In each iteration, current element values (pixel values) of the substitutional picture Xs (denoted Ps) are to-be-updated variables. Thus, a loss function for guiding the learning process (300) can be denoted L(Ps). In a similar manner as in the FIG. 2 example, the loss function L(Ps) can be established and take the following form, $$L(Ps) = R(Xs) + \lambda D(X, Xs'). \quad (Eq. 2)$$

Compared with the loss function L(Pe, Pd, Pr) (Eq. 1), in the loss function L(Ps), R(Xs) represents a rate loss that is a function of the element values Ps while with the optimized parameters Pe and Pr as constants; and D(X, Xs') represents a distortion loss that is also a function of the element values Ps while with the optimized parameters Pe and Pd as constants. In addition, for operations at the distortion loss generator (212) in FIG. 3, the difference is determined between a reconstructed picture Xs' and the input picture X but not between the reconstructed picture Xs' and the input picture Xs.

As an example, the learning process (300) in FIG. 3 can be performed as follows. For the t-th iteration, the substitutional picture Xs is denoted Xt and input to the ANN encoder (114). At the beginning of the learning process (300), the substitutional picture Xs can be initialized as $X_0$. In an embodiment, the input picture X in FIG. 1 is used as $X_0$. In an embodiment, a picture other than the input picture X in FIG. 1 is used as $X_0$. In an embodiment, a picture with random element values is used as $X_0$.

During the t-th iteration, corresponding to the input Xs=Xt and through forward inference computation, a latent representation Ys, a quantization representation Ys' the reconstructed representation Xs' can be determined as shown in FIG. 3. A distortion loss D(X, Xs') and a rate loss R(Xs) can be determined. A training loss R(Xs)+$\lambda$D(X, Xs') can be accordingly determined, for example, at the back-propagation and data update module (310). In an example, whether the training loss is less than a rate-distortion threshold is verified. When the training loss is not less than the rate-distortion loss, the module (310) can perform a back-propagation based on the loss function L(Xs) to calculate gradients corresponding to the element values of the input Xt. Based on the gradients, the element values of the input Xt can be adjusted resulting in a next input Xt+1. After T iterations, when the training loss is less than the rate-distortion loss, an optimal $X_T$ can be used as an output of the learning process (300).

In other embodiments, other termination conditions can be used alone or in combination with the rate-distortion threshold condition. For example, in an embodiment, when a number of the iterations reach a threshold, the iteration of the learning process (300) can be terminated. In this way, a time budget for generating the substitutional picture Xs can be controlled, and the E2E video coding system (100) can operate in real time.

In some embodiments, the learning process (300) can be based on two hyperparameters: a step size (or a learning rate) and a number of iterations. Together with the target loss function, the hyperparameters are used for the learning process (300). For example, the step size can be used in a gradient descent algorithm or a backpropagation calculation performed in the learning process. The number of iterations can be used as a threshold of a maximum number of iterations to control when the learning process (300) can be terminated.

In some embodiments, the step size and/or the number of iterations can be prefixed per picture input to the learning process (300) or the encoder (110). For example, a set of hyperparameters including the step size and the number of iterations can be predefined or preconfigured corresponding to the encoder (110). For example, if the encoder (110) has a higher computation capability, a higher value of the number of iterations can be configured, resulting in a substitutional picture with a higher quality. Or, a set of hyperparameters including the step size and the number of iterations can be predefined or preconfigured corresponding to a video sequence. For example, corresponding to different statistical characteristics of different video sequences, different sets of hyperparameters can be defined/configured per video sequence.

In some embodiments, the step size and/or the number of iterations can be adjustable per picture input to the learning process (300) or the encoder (110) based on the statistical characteristics of each picture. For example, for a picture including highly dynamic content, a smaller step size can be employed to avoid unnecessary oscillations and to speed up converge. In some embodiments, the hyperparameters used in the learning process are signaled from an encoder side to a decoder side.

In the FIG. 3 example, the same elements (114, 216, 124, 212, and 218) as in the FIG. 2 example are used for tuning the substitutional picture Xs. However, in other embodiments, a part or all of those elements used in the learning process (300) for tuning the substitutional picture Xs can be different than those in the FIG. 2 or FIG. 3 example. There can be various reasons for the variations.

For example, different configurations of those elements may be useful for achieving a better performance in terms of a faster learning process, a lower computation cost, a better rate-distortion result, or other advantages. For example, those elements may be simplified to achieve a same level, or an acceptable level of rate-distortion performance but with a reduced computation cost. Or, in some embodiments, variations of those elements can provide tools for control or manipulate certain video coding parameters over a previously trained E2E framework while maintaining a certain level of rate-distortion performance. Examples of the video coding parameters can include target bitrate, target distortion, image quality metric, or the like.

While the rate-distortion based loss functions (e.g., Eq. 1 and Eq. 2) are used in some embodiments for training E2E frameworks or searching for substitutional pictures, other types of loss functions may be employed in other embodiments of the substitutional picture based E2E video coding. For example, a loss function may include one or more loss terms other than a bitrate loss and a distortion loss for purpose of different optimization goals. Or, a loss function may include one or more loss terms in addition to a bitrate loss and/or a distortion loss.

In some embodiments, given an existing E2E optimized coding system (e.g., the framework (101) in FIG. 1), an E2E trained framework for determining substitutional pictures can be determined or derived based on the existing system, and then attached to the existing system. In this way, the substitutional E2E video coding techniques disclosed herein can be combined with existing E2E optimized coding system.

Figure 4:
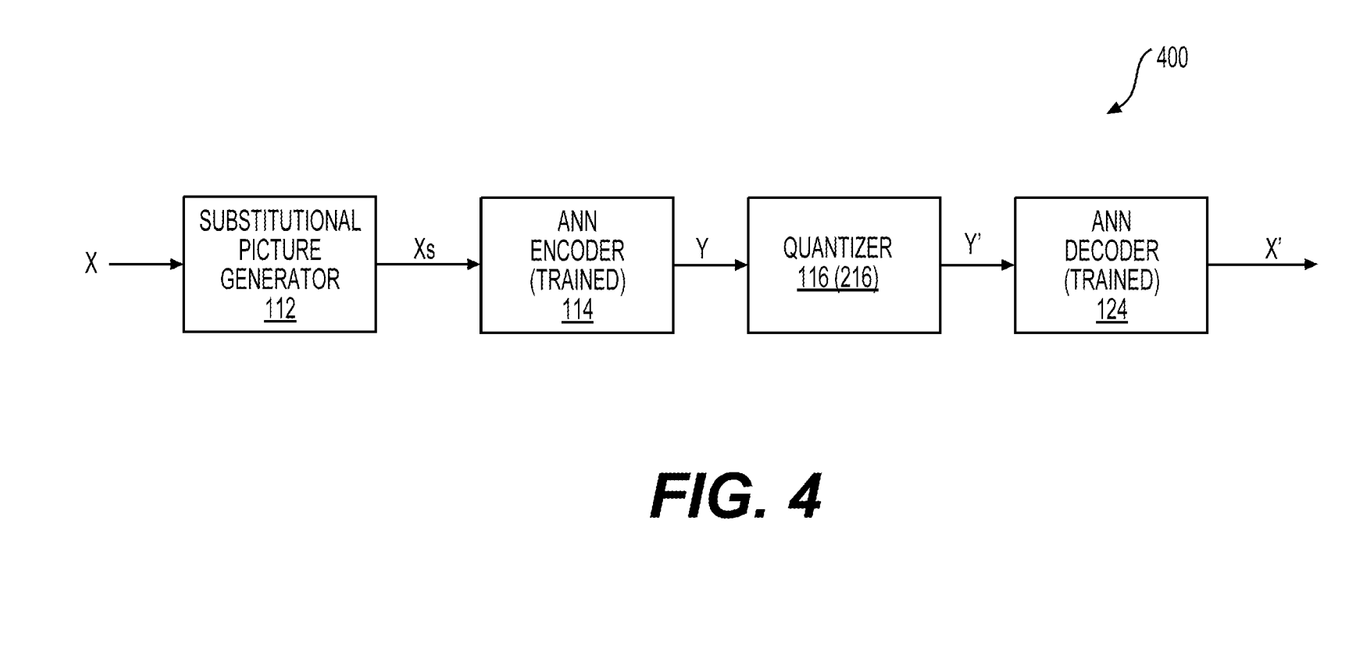
FIG. 4 shows a testing system (400) according to embodiments of the disclosure.

FIG. 4 shows a testing system (400) according to embodiments of the disclosure. The testing system (400) can be used for verifying the video coding performance of a substitutional picture based E2E optimized framework. As shown, the system (400) can include the substitutional picture generator (112), the ANN encoder (114), the quantizer (116 or 216), and the ANN decoder (124). The substitutional picture generator (112) can be configured to perform the learning process (300). The ANN encoder (114) and the ANN decoder (124) can be configured with the learned parameters Pe and Pd. The quantizer (116) can take a general uniform quantization approach in an embodiment. The quantizer (216) can be a uniform sampler approximating the effect of the quantizer (116), which avoids the difficulty of gradient backpropagation using discrete numbers in the learning process (300).

During testing, a picture X can be fed through the testing system (400). Corresponding to the input picture X, a substitutional picture Xs of the input picture X can be learned. Subsequently, a transformed representation Y, a compressed representation Y' and a reconstructed representation X' can be determined through forward inference computation. A rate measure (e.g., BPP) and a distortion measure (e.g., PSNR or SSIM) can be calculated for the reconstructed picture. The results can be compared with those of feeding the picture X through the elements (114, 116 or 216, 124) while skipping the element (112) in the testing system (400). Different samples in various data sets can be used for the testing over the testing system (400).

Generally, an E2E optimized video coding framework (e.g., the frameworks (101) and (201)) can have two major issues. First, it is difficult to achieve bitrate control. For example, an ANN model in an E2E optimized framework can be trained with a target bitrate. After the training, the ANN model generally cannot work well if applied to compress pictures with other bitrates. Second, an ANN model can be trained to (jointly) optimize a distortion loss formulated with a certain type of distortion metric, such as PSNR or SSIM, or to target a certain level of distortion given a certain type of distortion metric. The trained ANN model cannot work well in general for other types of distortion metric or other levels of distortion.

Due to these issues, to provide flexibility of compressing input pictures with different bitrates, different types of distortion metrics, or different levels of distortion of a specific distortion metric, multiple instances of ANN models need to be trained, stored, and deployed. In addition, the encoder side and decoder side in an E2E video coding system need to switch among different ANN encoders and decoders to realize bitrate or distortion metric variations. Further, control precisions of the variations depend on a number of ANN model instances. The above approach is overly expensive for an E2E video coding system to be practical.

Flexible bitrate control or distortion metric/level control are highly desired features for ANN-based video coding systems. For example, depending on the available storage and specific application scenario, a same input picture may be preferred to be compressed with different target bitrates.

The substitutional E2E video coding method disclosed herein provides mechanisms for efficiently addressing the above issues.

Figure 5:
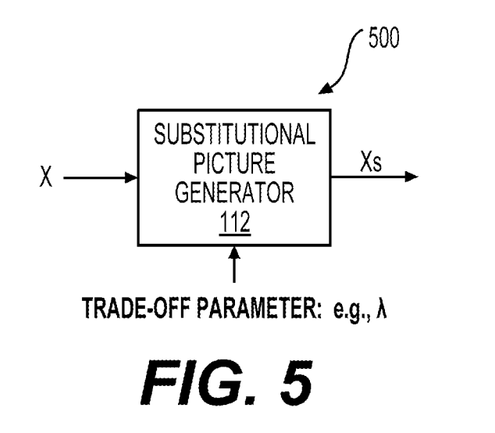
FIG. 5 shows a first bitrate control mechanism (500) based on adjusting a trade-off coefficient between a rate loss and a distortion loss.

FIG. 5 shows a first bitrate control mechanism (500) based on adjusting a trade-off coefficient between a rate loss and a distortion loss. For example, a target trade-off parameter $\lambda_{target}$ can be provided to the substitutional picture generator (112) in the E2E video coding system (100) to adjust the rate-distortion loss function (Eq. 2) used in the substitutional picture learning process (300). The adjusted rate-distortion function is shown below, $$L(Ps)=R(Xs)+\lambda_{target}D(X,Xs'). \quad \text{(Eq. 3)}$$

The target trade-off parameter $\lambda_{target}$ can correspond to a target bitrate (which can be known by experimental trials). By setting the trade-off parameter $\lambda_{target}$, the target bitrate can be achieved. For example, by setting the trade-off parameter $\lambda_{target}$ to a higher value, a higher bitrate and a lower distortion can be achieved.

For example, in the substitutional picture learning process (300), guided by the loss function (Eq. 3), a substitutional picture Xs can be tuned to have the target bitrate (after being coded) corresponding to the target trade-off parameter $\lambda_{target}$. The substitutional picture Xs can then be input to the E2E video coding system (100) that may be previously trained targeting a bitrate different from the current target bitrate. A bitstream (131) corresponding to the target bitrate can be obtained. Accordingly, the bitrate control is realized without switching the E2E framework (101) between different instances of ANN models.

In other embodiments, a rate-distortion loss as a weighted sum of a rate loss and a distortion loss may take a form other than (Eq. 2) or (Eq. 3). Accordingly, a parameter other than $\lambda$ can be used to adjust the trade-off between the respective rate loss and the respective distortion loss.

Figure 6:
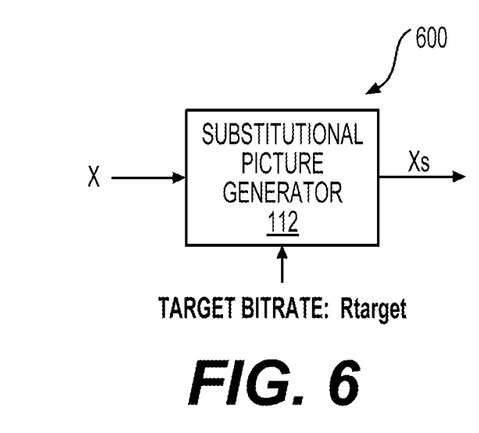
FIG. 6 shows a second bitrate control mechanism (600) based on setting a bitrate constraint (a target bitrate) in a rate-distortion loss function.

FIG. 6 shows a second bitrate control mechanism (600) based on setting a bitrate constraint (a target bitrate) in a rate-distortion loss function. For example, a target bitrate $R_{target}$ can be provided to the substitutional picture generator (112) in the E2E video coding system (100) to modify the rate-distortion loss function (Eq. 2) used in the substitutional picture learning process (300). The modified rate-distortion function is shown below, $$L(Ps)=\eta L(R(Xs),R_{target})+D(X,Xs'), \quad \text{(Eq. 4)}$$

where $L(R(Xs), R_{target})$ measures a loss of a difference between $R(Xs)$ and $R_{target}$, and $\eta$ is a hyperparameter (a trade-off parameter) that balances the contributions of different loss terms $L(R(Xs), R_{target})$ and $D(X, Xs')$. In an embodiment, $\eta$ can be set as a large number to ensure the resulting bitrate to be as close to the target bitrate $R_{target}$ as possible. During the substitutional learning process (300), guided by the loss function (Eq. 4), a substitutional picture Xs can be determined that has the target bitrate after being coded. The substitutional picture Xs can then be processed by the E2E video coding system (100) (that may be previously trained targeting a bitrate different from the current target bitrate) to realize the target bitrate without switching between different ANN model instances.

In an embodiment, the loss $L(R(Xs), R_{target})$ for measuring the difference between $R(Xs)$ and $R_{target}$ can be set as follows, $$L(R(Xs),R_{target})=\max(R(Xs)-R_{target},\epsilon), \quad \text{(Eq. 5)}$$

where $\epsilon$ is a hyperparameter. In an embodiment, $\epsilon$ can be set to a small number to ensure the difference between $R(Xs)$ and $R_{target}$ is within a certain range indicated by $\epsilon$.

Figure 7:
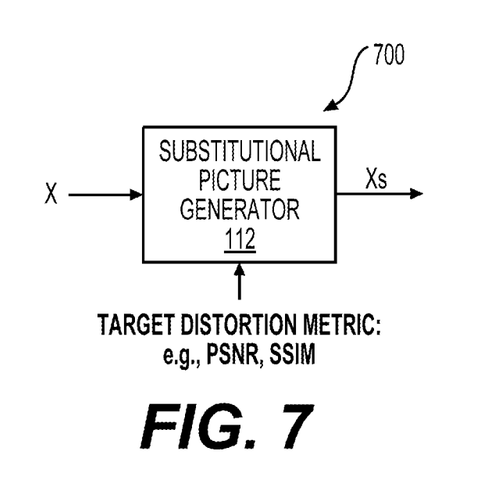
FIG. 7 shows a mechanism (700) for adjusting types of distortion metrics for encoding pictures with the pretrained E2E framework (101).

FIG. 7 shows a mechanism (700) for adjusting types of distortion metrics for encoding pictures with the pretrained E2E framework (101). For example, the E2E framework (101) in the E2E video coding system (100) can be trained to target a first distortion metric, for example, PSNR. This can be realized by using the PSNR metric to formulate the distortion loss D(X, X') in the rate-distortion loss function reproduced below, $$L(Pe,Pd,Pr)=R(X)+\lambda D(X,X'). \quad \text{(Eq. 1)}$$

To use the pretrained E2E framework (101) to encode pictures targeting a second distortion metric (e.g., SSIM) that is different from the first distortion metric, the adjustment can be performed as follows.

The target distortion metric (SSIM) can be provided to the substitutional picture generator (112) in the E2E video coding system (100) to formulate the distortion loss D(X, Xs') in the rate-distortion loss function (Eq. 2) used in the substitutional picture learning process (300). The rate-distortion function (Eq. 2) is reproduced below, $$L(Ps)=R(Xs)+\lambda D(X,Xs'). \quad \text{(Eq. 2)}$$

Guided by the loss function (Eq. 2) formulated with the target distortion metric type, a substitutional picture can be determined. Inputting the substitutional picture to the E2E framework (101) can result in a reconstructed picture X' that satisfies an expected rate-distortion performance of the target distortion metric without switching ANN model instances.

Figure 8:
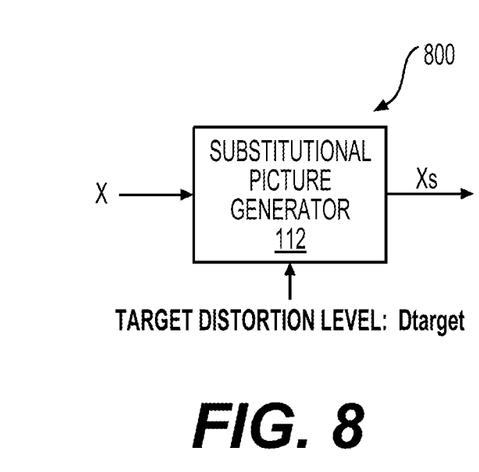
FIG. 8 shows a mechanism (800) for adjusting target distortion levels for encoding pictures with the pretrained E2E framework (101).

FIG. 8 shows a mechanism (800) for adjusting target distortion levels for encoding pictures with the pretrained E2E framework (101). For example, the E2E framework (101) in the E2E video coding system (100) can be trained to target a first distortion level for a given distortion metric (e.g., PSNR) based on the rate-distortion loss function (Eq. 1).

To encode pictures targeting a second distortion level for the given distortion, a target distortion level $D_{target}$ can be provided to the substitutional picture generator (112) in the E2E video coding system (100) to modify the rate-distortion loss function (Eq. 2) used in the substitutional picture learning process (300). The modified rate-distortion function is shown below, $$L(Ps)=R(Xs)+\eta L(D(X,Xs'),D_{target}), \quad \text{(Eq. 6)}$$

where $L(D(X, Xs'), D_{target})$ measures a loss of a difference between $D(X, Xs')$ and $D_{target}$, and $\eta$ is a hyperparameter (a trade-off parameter) that balances the contributions of different loss terms $R(Xs)$ and $L(D(X, Xs'), D_{target})$. In an embodiment, $\eta$ can be set as a large number to ensure the resulting distortion level to be as close to the target distortion level $D_{target}$ as possible. During the substitutional learning process (300), guided by the loss function (Eq. 6), a substitutional picture Xs can be determined that has the target distortion level after being coded. The substitutional picture Xs can then be processed by the E2E video coding system (100) to realize the target distortion level without switching between different ANN model instances.

In an embodiment, the loss $L(D(X, Xs'), D_{target})$ for measuring the difference between $D(X, Xs')$ and $D_{target}$ can be set as follows, $$L(D(X,Xs'),D_{target})=\max(D(X,Xs')-D_{target},\epsilon), \quad \text{(Eq. 7)}$$

where $\epsilon$ is a hyperparameter. In an embodiment, $\epsilon$ can be set to a small number to ensure the difference between $D(X, Xs')$ and $D_{target}$ is within a certain range indicated by $\epsilon$.

While the bitrate control and distortion metric/level control mechanisms are explained separately in the above description, some of the above bitrate control and distortion metric/level control mechanisms can be combined to adjust bitrate and distortion metric together in other embodiments. For example, adjusting the trade-off parameter λ and varying the target distortion metric type can be performed together by adjusting the loss function (Eq. 2). Adjusting the target bitrate $R_{target}$ and varying the target distortion metric type can be performed together by adjusting the loss function (Eq. 2).

In addition, the bitrate or distortion metric/level control mechanisms disclosed herein can be employed in combination with a loss function having a form other than the rate-distortion based loss functions described above. For example, for a loss function including one or more terms in addition to a bitrate loss and/or a distortion loss, the bitrate or distortion metric/level control mechanisms can still be applied.

Figure 9:
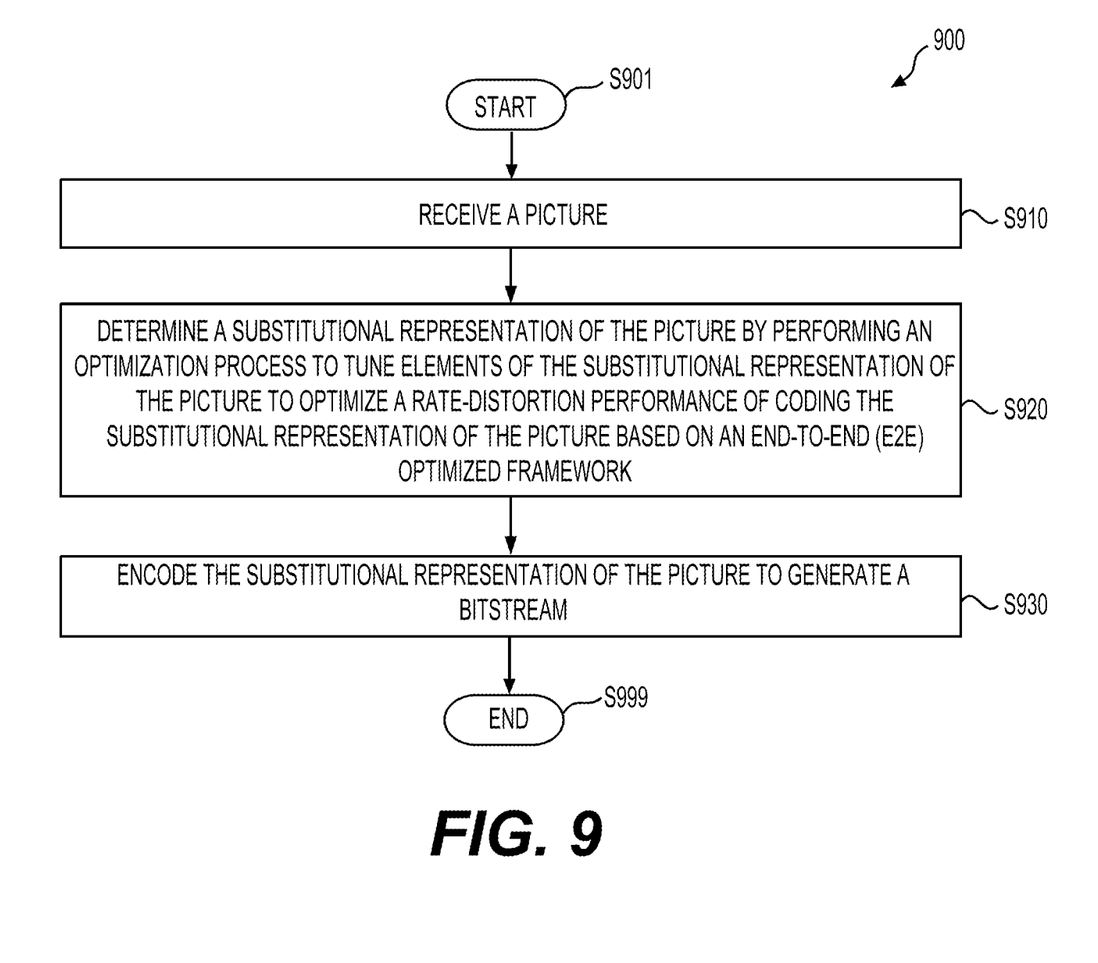
FIG. 9 shows a substitutional picture based E2E video coding process (900) according to embodiments of the disclosure.

FIG. 9 shows a substitutional picture based E2E video coding process (900) according to embodiments of the disclosure. The process (900) can start from (S901) and proceeds to (S910).

At (S910), a picture can be received, for example, from a video sequence. The picture can include elements (pixels) indicating color intensities.

At (S920), a substitutional representation of the picture can be determined. For example, a machine learning process (also referred to as an optimization process) can be performed to tune values of the elements of the substitutional representation of the picture to optimize a rate-distortion performance of coding the substitutional representation of the picture based on an end-to-end (E2E) optimized framework. In an example, the machine learning process to tune values of the elements of the substitutional representation of the picture can be performed to optimize a loss function with respect to the values of the elements of the substitutional representation of the picture. Examples of the E2E optimized framework can include the E2E trained framework (301) in the FIG. 3 example.

The machine learning process may include multiple iterations. During a current iteration of the machine learning process, a gradient descent can be performed to adjust current values of the elements of the substitutional representation of the picture to minimize the rate-distortion based loss function. Thereafter, the adjusted current values of the elements of the substitutional representation of the picture can be used as an input of a next iteration of the machine learning process.

In an example, the loss function includes a weighted sum of a bitrate measure and a distortion measure for coding the substitutional representation of the picture based on the E2E optimized framework. Examples of the loss function include the loss functions represented by Eqs. 1-4 and 6. In an example, the distortion measure includes a difference between the picture and a reconstructed picture of the substitutional representation of the picture when coded based on the E2E optimized framework.

At (S930), the substitutional representation of the picture can be encoded to generate a bitstream. For example, at the encoder (110) in the FIG. 1 example, after generated from the substitutional picture generator (112), the substitutional representation of the picture can be input to the ANN encoder (114) and encoded into the bitstream (131) that is subsequently stored in a storage medium or transmitted to the Decoder (120). The process (900) can then proceed to (S999) and terminate at (S999).

The techniques (e.g., functions, modules, elements, methods, processes, operations in various embodiments or examples) disclosed herein can be implemented by processing circuitry (e.g., one or more processors or one or more integrated circuits). In some examples, the techniques can be implemented as computer software using computer-readable instructions and physically stored in one or more computer-readable media.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
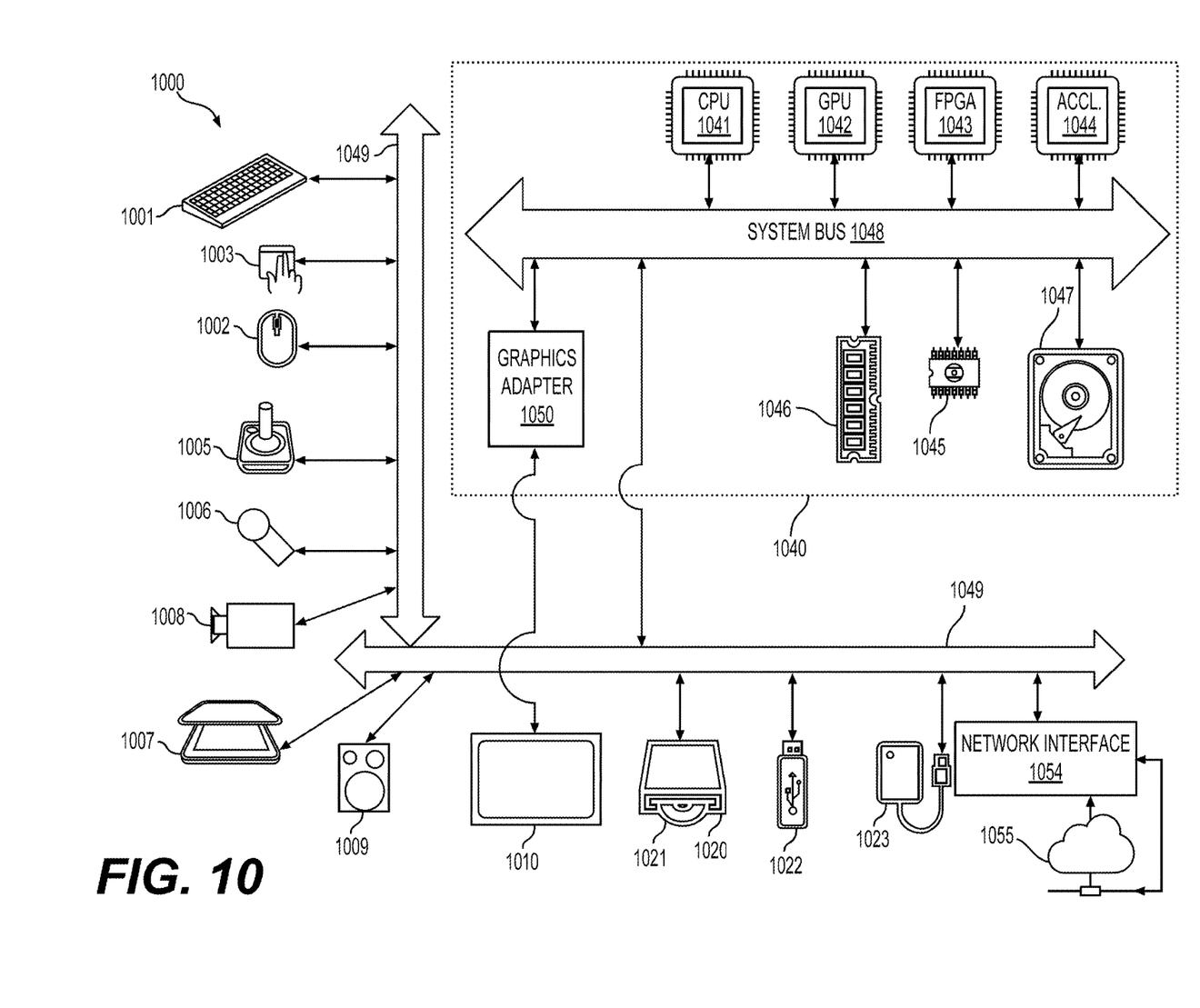
FIG. 10 is a schematic illustration of a computer system in accordance with an embodiment.

For example, FIG. 10 shows a computer system (1000) suitable for implementing certain embodiments of the disclosed subject matter. The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). The one or more networks (1055) can for example be wireless, wireline, optical. The one or more networks (1055) can further be local, wide-area, metropolitan, vehicular and industrial, real-time, delay-tolerant, and so on. Examples of the one or more networks (1055) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050) and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs. GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding at a video encoder, comprising:
   receiving a picture;
   determining a substitutional picture of the picture by performing an optimization process to tune elements of the substitutional picture of the picture to optimize a rate-distortion performance of coding the substitutional picture of the picture based on an end-to-end (E2E) optimized framework, the E2E optimized framework being an artificial neural network (ANN) based video coding framework that is pretrained, the optimization process being performed in an iterative manner based on the E2E optimized frame work to optimize a loss function with respect to the elements of the substitutional picture of the picture; and encoding the substitutional picture of the picture to generate a bitstream, wherein the loss function indicates the rate-distortion performance of coding the substitutional picture of the picture based on the E2E optimized framework, and during the optimization process that is performed in the iterative manner, values of the elements of the substitutional picture of the picture are tuned.

2. The method of claim 1, wherein the performing the optimization process includes:

performing the optimization process based on hyper-parameters including a step size and a number of iterations, the step size or the number of iterations being prefixed per picture input to the video encoder.

3. The method of claim 1, wherein the performing the optimization process includes:

performing the optimization process based on hyper-parameters including a step size and a number of iterations, the step size or the number being adjusted per picture input to the video encoder.

4. The method of claim 1, wherein a current iteration of the optimization process includes:

performing a gradient descent to adjust current values of the elements of the substitutional picture of the picture to minimize the loss function; and using the adjusted current values of the elements of the substitutional picture of the picture as an input of a next iteration of the optimization process.

5. The method of claim 1, wherein the loss function includes a weighted sum of a bitrate measure and a distortion measure for coding the substitutional picture of the picture based on the E2E optimized framework.

6. The method of claim 5, wherein the distortion measure includes a difference between the picture and a reconstructed picture of the substitutional picture of the picture when coded based on the E2E optimized framework.

7. The method of claim 5, further comprising:

adjusting a trade-off coefficient in the weighted sum to adjust a bitrate for coding the picture based on the E2E optimized framework.

8. The method of claim 5, wherein the bitrate measure includes a difference between a target bitrate and a bitrate for coding the substitutional picture of the picture based on the E2E optimized framework, and the method further comprises:

adjusting the target bitrate in the weighted sum to adjust a bitrate for coding the picture using the E2E optimized framework.

9. The method of claim 5, wherein the distortion measure is based on a target distortion metric type that is different from a distortion metric type used for optimizing the E2E optimized framework.

10. The method of claim 5, wherein the distortion measure is based on a target distortion metric type that is the same as a distortion metric type used for optimizing the E2E optimized framework.

11. The method of claim 5, wherein the distortion measure is based on a target distortion level of a distortion metric type that is different from a distortion level of the same distortion metric type used for optimizing the E2E optimized framework.

12. The method of claim 5, wherein the distortion measure is based on a target distortion level of a distortion metric type that is the same as a distortion level of the same distortion metric type used for optimizing the E2E optimized framework.

13. An apparatus of video encoding, comprising circuitry configured to:

receive a picture;

determine a substitutional picture of the picture by performing an optimization process to tune elements of the substitutional picture of the picture to optimize a rate-distortion performance of coding the substitutional picture of the picture based on an end-to-end (E2E) optimized framework, the E2E optimized framework being an artificial neural network (ANN) based video coding framework that is pretrained, the optimization process being performed in an iterative manner based on the E2E optimized frame work to optimize a loss function with respect to the elements of the substitutional picture of the picture; and encode the substitutional picture of the picture to generate a bitstream, wherein the loss function indicates the rate-distortion performance of coding the substitutional picture of the picture based on the E2E optimized framework, and during the optimization process that is performed in the iterative manner, values of the elements of the substitutional picture of the picture are tuned.

14. The apparatus of claim 13, wherein a current iteration of the optimization process includes:

performing a gradient descent to adjust current values of the elements of the substitutional picture of the picture to minimize the loss function; and using the adjusted current values of the elements of the substitutional picture of the picture as an input of a next iteration of the optimization process.

15. The apparatus of claim 13, wherein the loss function includes a weighted sum of a bitrate measure and a distortion measure for coding the substitutional picture of the picture based on the E2E optimized framework.

16. The apparatus of claim 15, wherein the distortion measure includes a difference between the picture and a reconstructed picture of the substitutional picture of the picture when coded based on the E2E optimized framework.

17. The apparatus of claim 15, wherein the circuitry is further configured to:

adjust a trade-off coefficient in the weighted sum to adjust a bitrate for coding the picture based on the E2E optimized framework.

18. A non-transitory computer-readable medium storing instructions that, when executed by a processor, cause the processor to perform a method of video encoding, the method comprising:

receiving a picture;

determining a substitutional picture of the picture by performing an optimization process to tune elements of the substitutional picture of the picture to optimize a rate-distortion performance of coding the substitutional picture of the picture based on an end-to-end (E2E) optimized framework, the E2E optimized framework being an artificial neural network (ANN) based video coding framework that is pretrained, the optimization process being performed in an iterative manner based on the E2E optimized frame work to optimize a loss function with respect to the elements of the substitutional picture of the picture; and encoding the substitutional picture of the picture to generate a bitstream, wherein the loss function indicates the rate-distortion performance of coding the substitutional picture of the picture based on the E2E optimized framework, and during the optimization process that is performed in the iterative manner, values of the elements of the substitutional picture of the picture are tuned.

* * * * *